United States Patent [19]
Lee et al.

[11] Patent Number: 5,134,844
[45] Date of Patent: Aug. 4, 1992

[54] AFT ENTRY COOLING SYSTEM AND METHOD FOR AN AIRCRAFT ENGINE

[75] Inventors: Ching-Pang Lee; Clay K. Carlson; Monty L. Shelton, all of Cincinnati; Harold P. Rieck, Jr., West Chester; Harvey W. Mason, Loveland; Ambrose A. Hauser, Wyoming, all of Ohio

[73] Assignee: General Electric Company, Cincinnati, Ohio

[21] Appl. No.: 560,538

[22] Filed: Jul. 30, 1990

[51] Int. Cl.$^5$ ............................................. F02C 3/00
[52] U.S. Cl. ................................... 60/39.751; 415/116
[58] Field of Search ......................... 60/39.75, 39.83; 415/115, 116, 117

[56] References Cited

U.S. PATENT DOCUMENTS

| | | | |
|---|---|---|---|
| 2,711,074 | 6/1955 | Howard | 60/39.75 |
| 3,233,866 | 2/1966 | Davidovic . | |
| 3,408,044 | 10/1968 | Burger . | |
| 3,527,053 | 9/1970 | Horn | 415/116 |
| 3,535,873 | 10/1970 | Szydlowski . | |
| 3,551,068 | 12/1970 | Scalzo et al. | 415/116 |
| 3,572,966 | 3/1971 | Borden et al. . | |
| 3,751,909 | 8/1973 | Kohler | 415/115 |
| 4,021,138 | 5/1977 | Scalzo et al. . | |
| 4,178,129 | 12/1979 | Jenkinson . | |
| 4,302,148 | 11/1981 | Tubbs . | |
| 4,326,686 | 4/1982 | Runge . | |
| 4,329,114 | 5/1982 | Johnston et al. | 415/116 |
| 4,375,891 | 3/1983 | Pask . | |
| 4,421,454 | 12/1983 | Wosika . | |
| 4,522,557 | 6/1985 | Bouiller et al. . | |
| 4,576,547 | 3/1986 | Weiner et al. | 60/726 |
| 4,711,084 | 12/1987 | Brockett . | |
| 4,730,982 | 3/1988 | Kervistin . | |
| 4,815,272 | 3/1989 | Laurello | 60/39.75 |
| 4,820,116 | 4/1989 | Houan et al. . | |

OTHER PUBLICATIONS

CFM56-5 Engine Airflow by CFM International.

*Primary Examiner*—Richard A. Bertsch
*Assistant Examiner*—Timothy S. Thorpe
*Attorney, Agent, or Firm*—Jerome C. Squillaro

[57] ABSTRACT

An aft entry system in a gas turbine engine is provided for cooling selected one or more of aft high and low pressure turbine stages of the engine. The aft entry system includes an air flow circuit for routing low pressure cooling air radially outward from an interstage region of a multi-stage compressor of a core engine of the gas turbine engine and axially in an aft direction to a plurality of radial passages, such as provided by stationary stator and outlet guide vanes, which provide an aft entry region to the selected high and low pressure turbine stages. The pressure of the cooling air routed by the air flow circuit of the aft entry system can be lower than the pressure of air at a discharge end of the compressor but higher than the pressure of the gas stream discharging from the selected turbine stage.

17 Claims, 3 Drawing Sheets

5,134,844

AFT ENTRY COOLING SYSTEM AND METHOD FOR AN AIRCRAFT ENGINE

BACKGROUND OF THE INVENTION

1. Field of the Invention

The present invention relates generally to a gas turbine engine and, more particularly, to an aft entry system and method for supplying cooling air to turbine stages of an aircraft turbine engine.

2. Description of the Prior Art

A gas turbine engine of the turbofan type generally includes a forward fan and booster compressor, a middle core engine, and an aft low pressure power turbine. The core engine encompasses a compressor, a combustor and a high pressure turbine in a serial flow relationship. The compressor and high pressure turbine of the core engine are interconnected by a central shaft. The compressor is rotatably driven to compress air entering the core engine to a relatively high pressure. This high pressure air is then mixed with fuel in the combustor and ignited to form a high energy gas stream. This gas stream flows aft and passes through the high pressure turbine, rotatably driving it and the core engine shaft which, in turn, rotatably drives the compressor.

In the turbofan engine, the residual gas stream leaving the core engine high pressure turbine is expanded through a second turbine, which as mentioned above is the aft low pressure turbine. The aft low pressure turbine, in turn, drives the forward fan via a separate shaft which extends forwardly through the central shaft of the high pressure turbine rotor. Although some of the thrust is produced by the residual gas stream exiting the core engine, most of the thrust produced is generated by the forward fan.

It is common practice with respect to gas turbine engines to provide some form of cooling for the hot regions of the turbine engine. This cooling has mainly involved the use of air bled from the compressor of the engine which is then fed to the regions of the engine to be cooled. Thereafter, the air is allowed to rejoin the main gas flow of the engine.

The efficiency of a gas turbine engine is dependent upon many factors. One factor is the degree to which high pressure air generated by the compressor of the engine and intended primarily for driving the high pressure turbine after passage through the combustor is siphoned or bled off to other uses in the engine. One such use of bleed air is the aforementioned cooling of metal surfaces in the hot regions of the engine to maintain them sufficiently to obtain useful strength properties. The greater the amount of high pressure air diverted to other uses in the engine, the less the amount of air to drive the core turbine and thus the less efficiently the high pressure turbine will operate.

Heretofore, the metal surfaces of the stator and rotor blades composing the high and low pressure turbines of the engine have typically been cooled by a forward air entry cooling flow system. In such forward air entry cooling system, high pressure air from the compressor is used to cool the low pressure turbine. The high pressure air is routed axially under the high pressure turbine located immediately forward of the low pressure turbine.

Significant drawbacks exist with the use of high pressure compressor air for cooling and employment of the forward air entry cooling system. One drawback is the reduction of high pressure turbine efficiency. Another drawback is the difficult and complicated task of passing the high pressure compressor air flow underneath the high pressure turbine in view of the presence of components such as the bearings of the high pressure turbine rotor.

Consequently, a need exists for an alternative system for cooling hot regions of an engine, such as the high and low pressure turbine stages of the gas turbine engines, which will avoid the above-mentioned drawbacks.

SUMMARY OF THE INVENTION

The present invention provides an aft entry cooling system and method designed to satisfy the aforementioned needs. In the aft entry system and method of the present invention, the cooling air flow path avoids flowing under the high pressure turbine rotor of the core engine and thus does not interfere with its bearing components.

The aft entry system and method of the present invention for cooling selected high and low pressure turbine stages improves engine performance in several ways. First, performance is improved in that only low pressure air, such as from the interstage of the compressor, needs to be used by the aft entry system. The pressure of the cooling air need only be high enough to exceed the pressure of the hot flow stream through the particular one of the high and low pressure turbine stages to which the cooling air will ultimately return. The lower pressure air has less work input to it, thus, use of the lower pressure air rather than compressor discharge air reduces the loss to the engine cycle for a given amount of air used. Second, performance is further improved in that use of air at lower pressure means that the temperature of the air is cooler and thus provides more efficient cooling. Third, performance is still further improved in that use of cooling air at low pressure means that the amount of leakage is reduced. The low pressure air can be from any suitable source, such as interstage compressor bleed air, bypass duct air, or spent cooling air from the engine shroud.

Accordingly, the present invention is directed to an aft entry system for cooling a selected one or more of the high and low pressure turbine stages of a gas turbine engine. The engine has an air compressor for producing compressed air at a discharge end, a combustor disposed downstream of the air compressor for receiving the compressed air from the discharge end thereof and producing a hot gas stream, and a turbine disposed downstream of the combustor for receiving the hot gas stream and producing at a discharge end thereof a hot gas stream. The aft entry cooling system of the present invention comprises: (a) at least one and preferably a plurality of stationary radial elements, such as in the form of stator and outlet guide vanes, disposed aft of the discharge end of the respective selected one or more of the high and low pressure turbine stages for providing flow communication between an interior side of the turbine and an exterior side thereof; and (b) an air flow circuit connected to a source of cooling air located forwardly of the selected one or more of the high and low pressure turbine stages for routing the cooling air from the forward source in an aft direction to the radial elements and then radially inwardly through the radial elements to the interior side of the turbine such that the cooling air is then routed via the interior side of the turbine forwardly to the selected one or more of the high and low pressure turbine stages.

Also, the present invention is directed to an aft entry cooling method for a gas turbine engine. As described above, the engine has an air compressor for producing compressed air at a discharge end, a combustor disposed downstream of the air compressor for receiving the compressed air from the discharge end thereof and producing a hot gas stream, and tandemly-arranged high and low pressure turbines disposed downstream of the combustor for receiving the hot gas stream and producing at a discharge end thereof a hot gas stream. The aft entry cooling method of the present invention comprises the steps of: (a) providing a radial passage for flow communication aft of the high pressure turbine from an exterior to interior sides of the turbine; and (b) routing cooling air from a source of cooling air located forwardly of the high pressure turbine in an aft direction to the radial passage located aft of a selected one or more of the high and low pressure turbine stages, radially inwardly through the radial passage to the interior side of the turbine, and then forwardly and radially outwardly to the selected one of the high and low pressure turbine stages.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
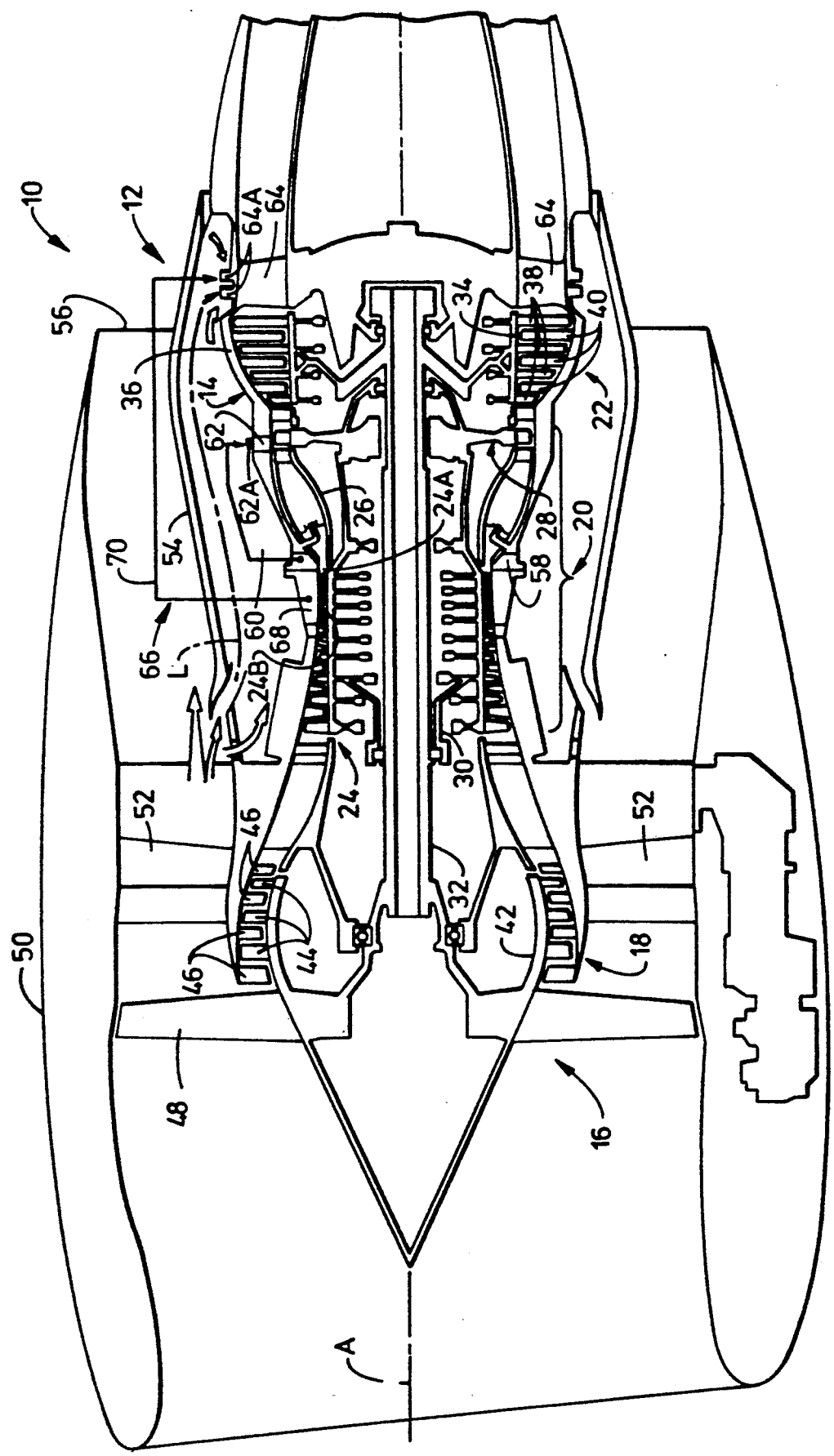
FIG. 1 is a longitudinal axial sectional view of a gas turbine engine having one embodiment of an aft entry cooling system in accordance with the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a gas turbine engine, generally designated 10, to which is applied one embodiment of an aft entry cooling system 12 in accordance with the present invention. Although the gas turbine engine 10 being illustrated is of the turbofan type, it should be understood that the aft air entry system 12 is applicable to other types of gas turbine engines.

Referring to FIG. 1, the engine 10 has a longitudinal center line or axis A and an annular casing 14 disposed coaxially and concentrically about the axis A. The engine 10 includes a forward fan 16 and a booster compressor 18, a middle core engine 20 and an aft low pressure power turbine 22. The core engine 20 encompasses a multi-stage compressor 24, a combustor 26 and a high pressure turbine 28, either single or multiple stage, all arranged coaxially about the longitudinal axis A of the engine 10 in a serial flow relationship. An annular outer drive shaft 30 fixedly interconnects the compressor 24 and high pressure turbine 28 of the core engine 20. The compressor 24 is rotatably driven to compress air entering the core engine 20 to a relatively high pressure. This high pressure air is then mixed with fuel in the combustor 26 and ignited to form a high energy gas stream. This gas stream flows aft and passes through the high pressure turbine 28, rotatably driving it and the outer drive shaft 30 of the core engine 20 which, in turn, rotatably drives the multi-stage compressor 24.

In the engine 10 being of the turbofan type, the residual gas stream discharged by the core engine high pressure turbine 28 is expanded through a second, power turbine, which as mentioned above is the aft low pressure turbine 22. The aft low pressure turbine 22 is rotated by gas stream flow and, in turn, drives the forward fan 16 and booster compressor 18 via a separate inner drive shaft 32 which extends forwardly through the annular outer drive shaft 30 of the core engine 20. Although some thrust is produced by the residual gas stream exiting the core engine 20, most of the thrust produced is generated by the forward fan 16.

The low pressure turbine 22 includes an annular rotatable rotor 34 and a stationary stator 36 disposed radially outwardly of the rotor 34. The low pressure turbine rotor 34 includes a plurality of turbine blade rows 38 extending radially outwardly therefrom and axially spaced from one another. The low pressure turbine stator 36 includes a plurality of stator vane rows 40 fixedly attached to and extending radially inwardly from the stationary casing 14. The stator vane rows 40 are axially spaced so as to alternate with the turbine blade rows 38 and define therewith multiple stages of the low pressure turbine 22.

The forward booster compressor 18 driven by the low pressure turbine 22 via the inner drive shaft 32 includes a rotor 42 and a plurality of booster blade rows 44 fixedly attached to and extending radially outwardly from the rotor 42 for rotation therewith. A plurality of booster stator vane rows 46 are fixedly attached to and extend radially inwardly from the stationary casing 14. Both the booster blade rows 44 and the stator vane rows 46 are axially spaced and so arranged to alternate with one another.

The booster compressor rotor 42 also supports a fan blade row 48 of the forward fan 16. The fan blade row 48 is housed within a nacelle 50 of the engine 10 supported about the stationary casing 14 by a plurality of radially extending and circumferentially spaced struts 52. A cowling 54 which encloses the core engine 20 and low pressure turbine 22 is disposed within and extends coaxially with a rear portion of the nacelle 50 so as to define therewith the discharge nozzle 56. Most of the thrust produced by the engine 10 is generated by air flow caused by rotation of the fan blade row 48 of the forward fan 16, which air flow passes over and through the nacelle 50 and from the discharge nozzle defined by the nacelle 50 and engine cowling 54.

Aft Entry Cooling System

Figure 2:
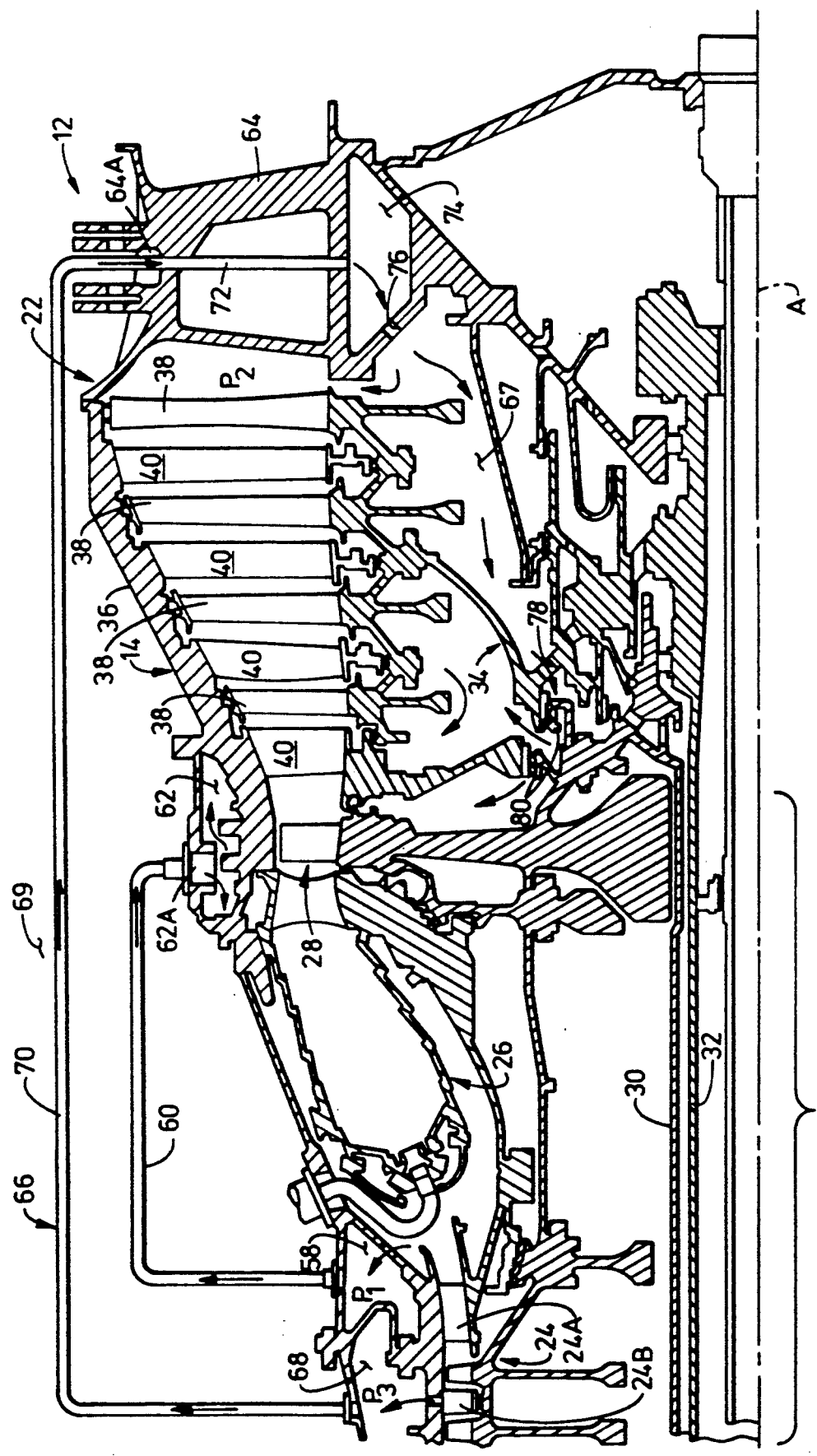
FIG. 2 is an enlarged fragmentary view of the turbine engine of FIG. 1, showing in greater detail the one aft entry cooling system embodiment of the present invention.

Referring now to FIG. 2, as provided in turbofan engines heretofore, some high pressure air is bled from the discharge end 24A of the multi-stage compressor 24 for cooling the high pressure turbine 28. This may be accomplished by several means, one of which is illustrated in FIG. 2 wherein high pressure air is bled into an annular cavity 58 and therefrom via a conduit 60 through an inlet port 62A in the engine casing 14 to an annular cooling chamber 62 which surrounds the high pressure turbine 28. Cooling of the high pressure turbine 28 using high pressure air from the discharge end 24A of the compressor 24 is necessary because of the requirement for the pressure of the cooling air to exceed the pressure of the gas stream flowing through the high pressure turbine in order for the cooling air to rejoin the main gas stream flow of the engine 10 after cooling the turbine 28.

The amount of high pressure air bled from the discharge end 24A of the compressor 24 is held to a minimum by employment of one embodiment of the aft entry system 12 of the present invention, as seen in FIG. 2, for routing cooling air to selected stages of the low pressure turbine 22 of the engine 10. The aft entry system 12 makes use of a plurality of outlet guide vanes 64 which per se were present heretofore in the engine 10 at the aft end of the low pressure turbine 22.

The aft entry system 12 provides an air flow circuit 66 which supplies low pressure cooling air from a suitable forward source to the aft and interior side 67 of the low pressure turbine 22. More particularly, the air flow circuit 66 includes another annular cavity 68 which surrounds an interstage portion 24B of the compressor 24 and into which low pressure air is bled from the compressor interstage portion 24B, and a hollow conduit 70 interconnecting the cavity 68 and the outlet guide vanes 64 (only one shown in FIG. 2) for routing low pressure cooling air radially outward from the annular cavity 68 to the exterior side 69 of the turbine 22 and then axially in an aft direction to an inlet 64A to the vanes 64.

Suitable means such as another conduit 72 extends through each vane 64 to an inner annular chamber 74 which defines an aft entry region to the low pressure turbine 22 at its interior side 67. Orifices 76, 78 are provided in the respective interior structures of the vanes 64 and the low pressure turbine rotor 34 and its seals 80 to define flow paths (as designated by the arrows in the interior of the rotor 34 in FIG. 2) for the low pressure cooling air directed radially outwardly from the interior side 67 of the low pressure turbine 22 to the dovetail mounting structures of the turbine blade rows 38 for cooling the same before return of the cooling air to the main gas stream through the low pressure turbine 12.

Referring to FIG. 2, in one practical example, the pressure $P_3$ of the cooling air routed by the air flow circuit 66 of the aft entry system 12 from the interstage portion 24B of the compressor 24 is lower than the pressure $P_1$ of air at the discharge end 24A of the compressor 24 but higher than the pressure $P_2$ of the gas stream discharging from the low pressure turbine 22. Consequently, the high pressure air from the compressor 24 is conserved, while the low pressure air being utilized is of sufficient pressure to return into the main gas stream discharging from the low pressure turbine 22. It should be understood that other sources of low pressure air, besides the air from the interstage portion 24B of the compressor 24 can be utilized. One such source is depicted in FIG. 1 by the dashed line L which represents bleeding of air from the main flow through the nacelle 50 and over the cowling 54 to the inlet 64A to the outlet guide vanes 64.

Further, it should be understood that sufficient pumping of the cooling air through the air flow circuit 66 is brought about by the interior structure of the rotating low pressure turbine rotor 34 making it unnecessary to provide additional structures for achieving more positive pumping action. However, if it is found that more positive pumping action is desired, a set of blades can easily be mounted to the interior rotor structure along the flow path of the cooling air.

Figure 3:
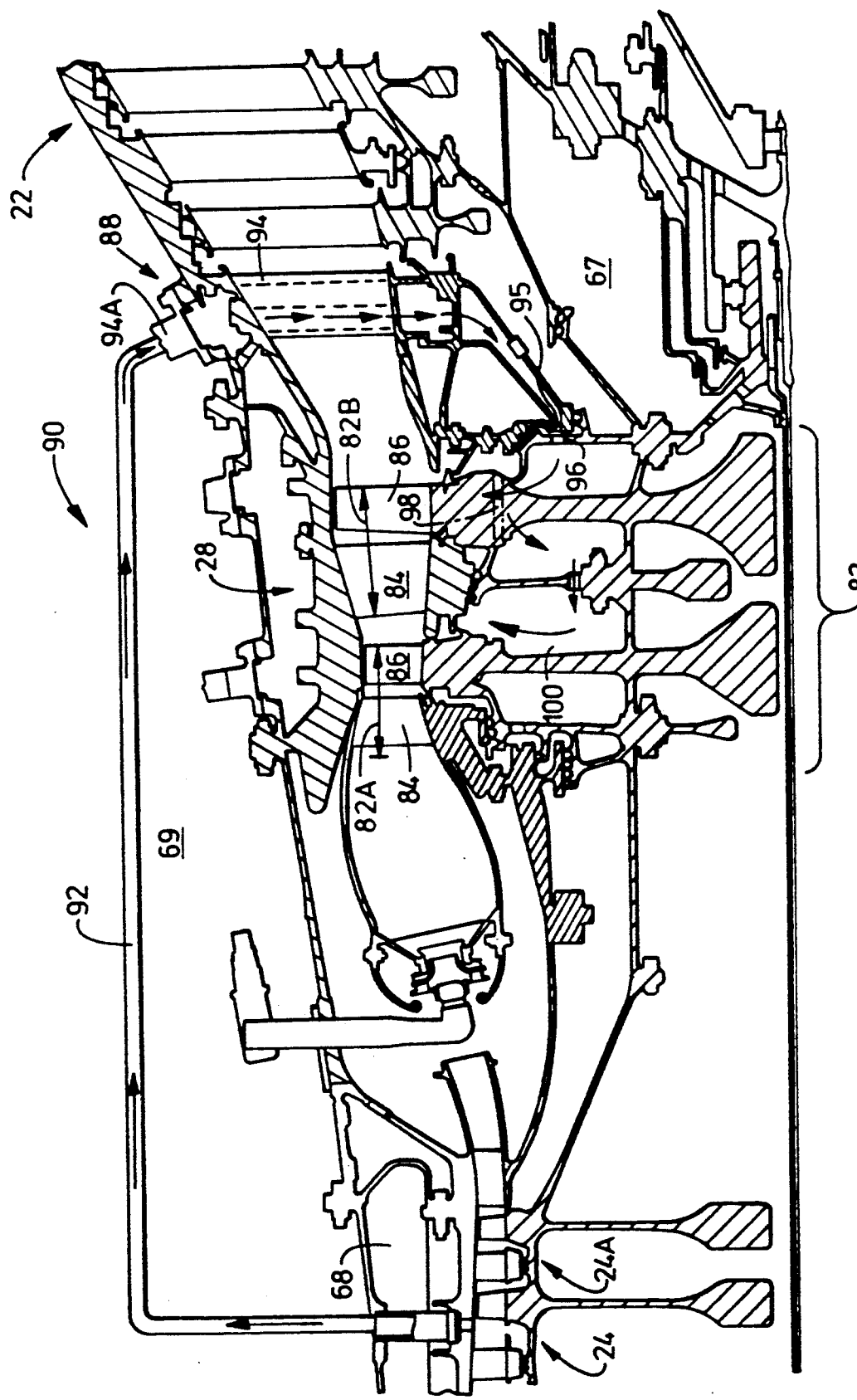
FIG. 3 is an enlarged fragmentary view of another turbine engine, showing in greater detail another embodiment of an aft entry cooling system in accordance with the present invention.

Turning now to FIG. 3, there is illustrated another embodiment of the aft entry system of the present invention which differs from the embodiment of FIGS. 1 and 2 by the location to which air is exteriorly routed and to which of the turbine stages the cooling air is routed. The engine 10 includes multiple stages 82 of the high pressure turbine 28, each of a first stage 82A and a second stage 82B being composed of a stationary stator vane 84 and a rotary turbine blade.

An aft entry system 88 provides an air flow circuit 90 which supplies low pressure cooling air from the annular cavity 68 which surrounds the interstage portion 24B of the compressor 24 through a hollow conduit 92 interconnecting the cavity 68 and a stage of hollow stationary stator vanes 94 (only one shown in FIG. 3) of the low pressure turbine 22. The circuit 90 routes low pressure cooling air radially outward from the annular cavity 68 to the exterior side 69 of the turbine 22 and then axially in an aft direction to an inlet 94A to the stator vanes 94 and through the vanes 94 to the interior side 67 of the turbines.

At the interior turbine side 67, the air driven by an inducer 95 flows forwardly, entering slots 96 in the second stage turbine 82B. The cooling air passes out dovetail slots 98 into a cavity 100 between the turbine stages 82A, 82B from where it returns to the hot air stream through the high pressure turbine 28, cooling the structures of the high pressure turbine 28 along the air flow path.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In a gas turbine engine having a longitudinal axis and an air compressor, a combustor, and tandemly-arranged high and low pressure turbines disposed in a serial arrangement along said longitudinal axis, said air compressor for producing a rearward flow of compressed air of a first pressure at a discharge end, said combustor being disposed downstream of said discharge end of said air compressor for receiving the rearward flow of compressed air from said discharge end thereof and producing a rearwardly flowing hot gas stream at a discharge end, said tandemly-arranged high and low pressure turbines having interior and exterior sides extending about said longitudinal axis, said interior side being located closer to said longitudinal axis than said exterior side, said turbines being disposed downstream of said discharge end of said combustor, said high pressure turbine having at least one high pressure turbine stage for receiving the rearwardly flowing hot gas stream and producing at a discharge end thereof a rearwardly flowing hot gas stream, said lower pressure turbine having a plurality of turbine stages disposed aft of said discharge end of said high pressure turbine and producing at a discharge end of said low pressure turbine a rearwardly flowing hot gas stream of a second pressure being lower than the first pressure, said air compressor having an interstage portion located upstream of said discharge end thereof and producing a rearward flow of compressed air of a third pressure being lower than said first pressure of air at said discharge end of said compressor but higher than said second pressure at said discharge end of said low pressure turbine, an aft entry cooling system, comprising:

(a) stationary means disposed aft of said discharge end of said low pressure turbine and extending radially outwardly relative to said longitudinal axis for providing flow communication between said interior side of said turbines and said exterior side thereof; and (b) an air flow circuit connected to said interstage portion of said air compressor and to said stationary means for routing the cooling air of said third pressure from said interstage portion of said air compressor in a rearward direction to said stationary means, radially inwardly through said stationary means to said interior turbine side, and then forwardly through said interior turbine side and radially outwardly therethrough to a selected one of said low pressure turbine stages.

2. The system as recited in claim 1, wherein said stationary means is a plurality of elements spaced circumferentially from one another about said longitudinal axis and extending radially outwardly from said longitudinal axis.

3. The system as recited in claim 2, wherein each of said radial elements is in the form of an outlet guide vane disposed aft of the discharge end of said low pressure turbine stages for providing flow communication between said interior turbine side and said exterior side thereof.

4. The system as recited in claim 1, wherein said air flow circuit includes:

an annular cavity surrounds said interstage portion of said compressor and into which air is bled from said compressor interstage portion; and a conduit located along said exterior turbine side and interconnecting said cavity and said stationary means for routing cooling air radially outward from said cavity and then axially in the aft direction to said stationary means.

5. In a gas turbine engine having a longitudinal axis and an air compressor, a combustor, and tandemly-arranged high and low pressure turbines disposed in a serial arrangement along said longitudinal axis, said air compressor for producing a rearward flow of compressed air of a first pressure at a discharge end, said combustor being disposed downstream of said discharge end of said air compressor for receiving the rearward flow of compressed air from said discharge end thereof and producing a rearwardly flowing hot gas stream at a discharge end, said tandemly-arranged high and low pressure turbines having interior and exterior sides extending about said longitudinal axis, said interior side being located closer to said longitudinal axis than said exterior side, said turbines being disposed downstream of said discharge end of said combustor, said high pressure turbine having a plurality of high pressure turbine stages for receiving the rearwardly flowing hot gas stream and producing at a discharge end thereof a rearwardly flowing hot gas stream, said air compressor having an interstage portion located upstream of said discharge end thereof and producing a rearward flow of compressed air of a second pressure being lower than said first pressure of air at said discharge end of said compressor, an aft entry cooling system, comprising:

(a) stationary means disposed aft of said discharge end of said high pressure turbine and extending radially outwardly relative to said longitudinal axis for providing flow communication between said interior side of said turbine and said exterior side thereof; and (b) an air flow circuit connected to said interstage portion of said air compressor and to said stationary means for routing the cooling air of said second pressure from said interstage portion of said air compressor in a rearward direction to said stationary means, radially inwardly through said stationary means to said interior turbine side, and then forwardly through said interior turbine side and radially outwardly therethrough to a selected one of said high pressure turbine stages.

6. The system as recited in claim 5, wherein said stationary means is a plurality of elements spaced circumferentially from one another about said longitudinal axis and extending radially outwardly relative to said longitudinal axis.

7. The system as recited in claim 6, wherein each of said radial elements is in the form of stationary stator vane located aft of said high pressure turbine.

8. The system as recited in claim 7, wherein said stator vane is in said low pressure turbine.

9. The system as recited in claim 5, wherein said air flow circuit includes:

an annular cavity surrounds said interstage portion of said compressor and into which air is bled from said compressor interstage portion; and a conduit located along the exterior turbine side and interconnecting said cavity and said stationary means for routing cooling air radially outward from said cavity and then axially in the aft direction to said element.

10. In a gas turbine engine having a longitudinal axis and an air compressor, a combustor, and tandemly-arranged high and low pressure turbines disposed in a serial arrangement along said longitudinal axis, said air compressor for producing a rearward flow of compressed air of a first pressure at a discharge end, said combustor being disposed downstream of said discharge end of said air compressor for receiving the rearward flow of compressed air from said discharge end thereof and producing a rearwardly flowing hot gas stream at a discharge end, said tandemly-arranged high and low pressure turbines having interior and exterior sides extending about said longitudinal axis, said interior side being located closer to said longitudinal axis than said exterior side, said turbines being disposed downstream of said discharge end of said combustor, said high pressure turbine having a plurality high pressure turbine stages for receiving the rearwardly flowing hot gas stream and producing at a discharge end thereof a rearwardly a rearwardly flowing hot gas stream, said lower pressure turbine having a plurality of turbine stages disposed aft of said discharge end of said high pressure turbine and producing at a discharge end of said low pressure turbine a rearwardly flowing hot gas stream of a second pressure being lower than the first pressure, said air compressor having an interstage portion located upstream of said discharge end thereof and producing a rearward flow of compressed air of a third pressure being lower than said first pressure of air at said discharge end of said compressor but higher than said second pressure at said discharge end of said low pressure turbine, an aft entry cooling system, comprising:

(a) a plurality of stationary aerodynamic elements disposed aft of said discharge end of said high pressure turbine and extending radially outwardly relative to said longitudinal axis for providing flow communication between said interior side of said turbines and said exterior side thereof; and (b) an air flow circuit connected to said interstage portion of said air compressor and to said aerodynamic elements for routing the cooling air of said third pressure from said interstage portion of said air compressor in a rearward direction to said aerodynamic elements, radially inwardly through said aerodynamic elements to said interior turbine side, and then forwardly through said interior turbine side to a selected one or more of said high and low pressure turbine stages.

11. The system as recited in claim 10, wherein each of said aerodynamic elements is in the form of an outlet guide vane disposed aft of the discharge end of said low pressure turbine stages for providing flow communication between said interior turbine side and said exterior side thereof.

12. The system as recited in claim 10, wherein each of said aerodynamic elements is in the form of stationary stator vane located aft of said high pressure turbine.

13. The system as recited in claim 12, wherein said stator vane is in said low pressure turbine.

14. The system as recited in claim 10, wherein said air flow circuit includes:

an annular cavity surrounds said interstage portion of said compressor and into which air is bled from said compressor interstage portion; and a conduit located along said exterior turbine side and interconnecting said cavity and said radial elements for routing cooling air radially outward forms aid cavity and then axially in the aft direction to said element.

15. In a gas turbine engine having a longitudinal axis and an air compressor, a combustor, and tandemly-arranged high and low pressure turbines disposed in a serial arrangement along said longitudinal axis, said air compressor for producing a rearward flow of compressed air of a first pressure at a discharge end, said combustor being disposed downstream of said discharge end of said air compressor for receiving the rearward flow of compressed air from said discharge end thereof and producing a rearwardly flowing hot gas stream at a discharge end, said tandemly-arranged high and low pressure turbines having interior and exterior sides extending about said longitudinal axis, said interior side being located closer to said longitudinal axis than said exterior side, said turbines being disposed downstream of said discharge end of said combustor for receiving the rearwardly flowing hot gas stream and producing at a discharge end of said low pressure turbine a rearwardly flowing hot gas stream of a second pressure being lower than the first pressure, said air discharge end thereof and producing a rearward flow of compressed air of a third pressure being lower than said first pressure of air at said discharge end of said compressor but higher than said second pressure at said discharge end of said low pressure turbine, an aft entry cooling method, comprising the steps of:

(a) providing a plurality of passages extending radially relative to said longitudinal axis for flow communication rearward of the high pressure turbine from said exterior to interior sides of the turbine; and (b) routing cooling air from said interstage portion of said air compressor in a rearward direction to the passages located rearward of a selected one or more of the high and low pressure turbine stages, radially inwardly through the passages to the interior side of the turbine, and then forwardly and radially outwardly to the selected one of the high and low pressure turbine states.

16. The method as recited in claim 15, further comprising:

providing a plurality of radial passages of flow communication at the discharge end of the turbine; and routing the cooling air through all of the radial passages.

17. In a gas turbine engine having a longitudinal axis and an air compressor, a combustor, and tandemly-arranged high and low pressure turbines disposed in a serial arrangement along said longitudinal axis, said air compressor for producing a rearward flow of compressed air of a first pressure at a discharge end, said combustor being disposed downstream of said discharge end of said air compressor for receiving the rearward flow of compressed air from said discharge end thereof and producing a rearwardly flowing hot gas stream at a discharge end, said tandemly-arranged high and low pressure turbines having interior and exterior sides extending about said longitudinal axis, said interior side being located closer to said longitudinal axis than said exterior side, said turbines being disposed downstream of said discharge end of said combustor for receiving the rearwardly flowing hot gas stream and producing at a discharge end of said low pressure turbine a rearwardly flowing hot gas stream of a second pressure being lower than the first pressure, said air compressor having an interstage portion located upstream of said discharge end thereof and producing a rearward flow of compressed air of a third pressure being lower than said first pressure of air at said discharge end of said compressor but higher than said second pressure at said discharge end of said low pressure turbine, an aft entry method for cooling said low pressure turbine, comprising the steps of:

(a) providing a plurality of stationary aerodynamic elements for flow communication rearward of the discharge end of the low pressure turbine between the interior side of the low pressure turbine and the exterior side thereof; and (b) routing cooling air at the third pressure radially outward to the exterior of the compressor from said interstage portion thereof located forwardly of the discharge end thereof, next in the rearward direction to the stationary aerodynamic elements, and then radially inwardly through the aerodynamic elements to the interior side of the low pressure turbine, the third pressure of the cooling air routed to the interior side of the low pressure turbine being lower than the first pressure of air at the discharge end of the compressor but higher than the second pressure of the gas stream discharging from the low pressure turbine.

* * * * *